United States Patent [19]
Copp et al.

[11] 3,913,773
[45] Oct. 21, 1975

[54] CEILING BOX FOR ELECTRICAL OUTLETS

[75] Inventors: Donald G. Copp, Mantua; James C. Ellsworth, Kent, both of Ohio; Charles E. Mosher, New Rochelle, N.Y.

[73] Assignee: Indian Head, Inc., New York, N.Y.

[22] Filed: Aug. 28, 1972

[21] Appl. No.: 284,177

[52] U.S. Cl. ................. 220/3.92; 220/3.3; 220/3.8; 220/3.94
[51] Int. Cl.² ........................................ H02G 3/08
[58] Field of Search ............. 220/3.2, 3.3, 3.4–3.94; 248/57, DIG. 6; 174/61–64

[56] References Cited
UNITED STATES PATENTS

| | | | |
|---|---|---|---|
| 2,730,261 | 1/1956 | Tutt | 220/3.7 |
| 2,758,810 | 8/1956 | Good | 220/3.9 |
| 3,029,964 | 4/1962 | Hudson et al. | 220/3.4 |
| 3,343,704 | 9/1967 | Terry | 220/3.7 |
| 3,525,450 | 8/1970 | Payson | 220/3.7 |
| 3,773,968 | 11/1973 | Copp | 220/27 |

FOREIGN PATENTS OR APPLICATIONS 1,316,580   12/1962   France

*Primary Examiner*—William T. Dixson, Jr.
*Assistant Examiner*—Joseph M. Moy
*Attorney, Agent, or Firm*—William R. Laney

[57] ABSTRACT

A box or container mountable in ceilings for containing contacts or terminals of electrical leads facilitating supplying electrical service, the box constituting a straight draw, molded synthetic resin housing having a hanger bracket integrally formed on the upper side thereof. The hanger bracket defines a supporting rod receiving passageway extending substantially parallel to a top side of the box, and is formed by a straight draw molding process concurrently with the formation of the right parallelepiped box.

6 Claims, 5 Drawing Figures

CEILING BOX FOR ELECTRICAL OUTLETS

BACKGROUND OF THE INVENTION

1. Field of the Invention

This invention relates to ceiling boxes used for housing electrical terminals by which electrical service may be provided to a room in which the ceiling is located. More particularly, the present invention relates to an improved ceiling box for providing electrical service, which ceiling box, by reason of its geometry, can be fabricated with an integrally formed hanger bracket by a single step straight draw molding process.

2. Brief Description of the Prior Art

Electrical boxes or receptacles for providing acessibility to electrical service through appropriate sockets or quick detachable circuit making connections are well known in the art and are widely used. These boxes are frequently mounted in walls and ceilings during the construction of buildings to provide ready access to electrical service. It has been a customary practice to make these boxes or receptacles of metal or of a synthetic resin. The synthetic resin boxes are frequently lighter, safer and more economically constructed than metal boxes.

In the manufacture of synthetic resin electrical boxes, it has often been necessary to use complicated molds or complicated molds and dies for the purpose of forming the boxes so as to provide the necessary access openings to permit electrical cables and conduits to be passed through the walls or top of the boxes and connected to suitable terminals or contacts located inside the boxes. Also, the fabrication procedure is complicated in the case of ceiling boxes by the necessity to provide a hanger bracket on the upper side of the box to permit it to be suspended between structural members at the desired location in the ceiling. The hanger brackets have been separately molded or fabricated and then attached to the upper side of the electrical boxes by screws or rivets. Moreover, in the case of the boxes themselves, these have generally been fabricated from synthetic resin by using male and female reciprocating dies or mold parts moving toward and away from each other, and in addition, side coring mold parts for forming apertures or pry-out tabs in the sides and/or top of the boxes to permit access to be had to the inside of the box for the purpose of extending wires or cables thereinto during installation. In view of the necessity to provide such pry-out tabs or openings in the electrical boxes, and the further necessity to provide hanger brackets on the upper side thereof, it has not previously been thought possible to make such boxes by a straight draw molding process in which it is only necessary to use two reciprocating mold halves which move into co-operating relationship to form the box and hanger bracket in a single one shot molding process.

BRIEF DESCRIPTION OF THE PRESENT INVENTION

The ceiling box of the present invention broadly comprises a synthetic resin housing, which is preferably constructed of polyvinyl chloride, and which is preferably configured as a substantially right parallelepiped member positioned atop, and formed integrally with, a shallow cylindrical base. The housing, in its preferred shape, is characterized in having four side walls and a top wall extending between, and normal to, the side walls. At the intersection of each side wall with the top wall, and intermediate the length of the respective side wall, a pry-out or knock-out panel assembly is preferably provided, and preferably occupies a plane extending at an angle of about 45° with respect to the respective intersecting side wall and top wall.

Formed integrally with the top wall of the ceiling box, and projecting upwardly from the center thereof, is a hanger bracket which defines a passageway through which may be extended a metallic hanger for suspending or hanging the ceiling box between structural members in the ceiling at a desired location. An opening is formed through the top wall of the box immediately below the hanger bracket so that the hanger bracket may be formed integrally with the raminder of the box by a straight draw molding process.

An important object of the invention is to provide a ceiling box which can be constructed by a one-step, straight draw molding process, with a suitable hanger bracket being included as an integral part of the box to facilitate its mounting in a ceiling or the like.

Another object of the invention is to provide a mechanically strong, relatively inexpensive and easily installed ceiling box which can be used for providing electrical contacts to supply electrical service to the interior of a room.

A further object of the invention is to provide an integrally molded, synthetic resin ceiling box which is configured to facilitate the formation of the box in an economical and expedient fashion, and to provide greater ease in extending electrical conduits to the interior of the box for connection to appropriate terminals located therein.

Additional objects and advantages of the invention will become apparent from the following detailed description of the invention when read in conjunction with the accompanying drawings which illustrate the invention.

DETAILED DESCRIPTION OF A PREFERRED EMBODIMENT OF THE INVENTION

Figure 1:
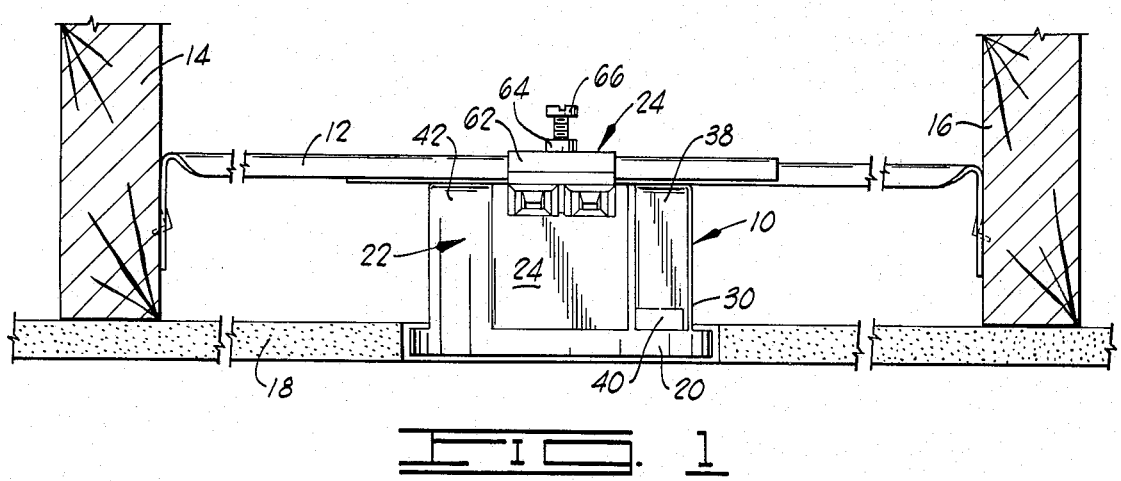
FIG. 1 is a sectional view through a ceiling, illustrating in elevation the ceiling box of the present invention as it is operatively mounted between ceiling structural members.

Referring initially to FIG. 1 of the drawings, shown therein is a ceiling box constructed in accordance with the present invention, and designated generally by reference numeral 10. The ceiling box 10 is supported by an extensible metal rod 12 which has its ends suitably secured to a pair of parallel ceiling joists 14 and 16. The box 10 is positioned so that the lower side of the box is flush with a panel 18 of sheet rock or the like used to form the ceiling. The panel 18 has a circular aperture dimensioned to receive a shallow cylindrical base portion 20 of the ceiling box 10.

Figures 2, 3:
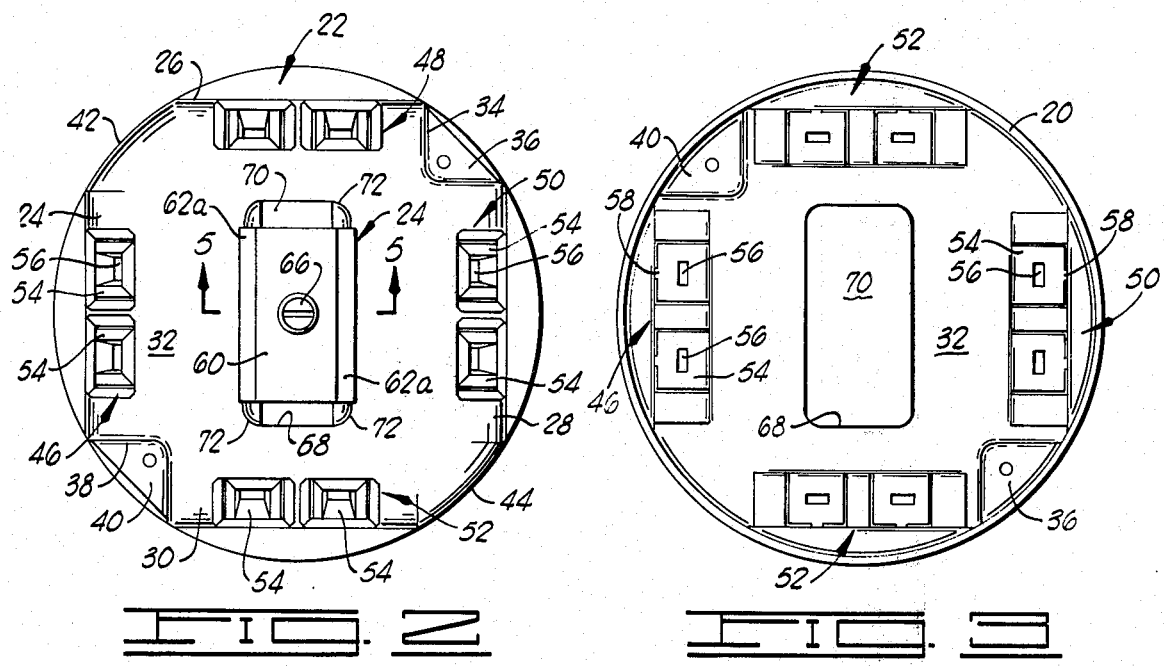
FIG. 2 is a top plan view of the ceiling box of the invention.
FIG. 3 is a bottom plan view of the ceiling box.

The ceiling box further includes a housing or body portion 22 of generally right parallelepiped configuration and a hanger bracket 24. The housing 22 is formed integrally with the shallow cylindrical base portion 20 of the ceiling box, and includes four side walls 24, 26, 28 and 30. These side walls are connected at their upper side edges to an integrally formed top wall 32. At diagonally opposite corners of the housing 22, recesses or indentations are formed between the adjacent side walls. Thus, as shown in FIG. 2, a right triangular indentation 34 is formed between the side walls 26 and 28. Immediately above the shallow cylindrical base 20 of the box, a screw receiving lug 36 is formed at the bottom of the recess or indentation 34. In similar fashion, a recess or indentation 38 is formed between the side walls 24 and 30 on the opposite side of the box from the recess 34, and a screw receiving lug 40 is positioned in the bottom of this recess immediately above the shallow cylindrical base 20. At the other two corners of the right parallelepiped shaped housing 22, the housing is radiused between the adjacent side walls so as to include arcuate portions 42 and 44 formed on the same radius as the shallow cylindrical base 20.

At the intersections of the top wall 32 with the several side walls 24, 26, 28 and 30, a pry-out or knockout panel assembly is provided, and each of these assemblies lies in a plane extending at an angle of 45° with respect to the respective side wall and top wall. Thus, between the side wall 24 and the top wall 32, a pry-out panel assembly designated generally by reference numeral 46 is provided, and identically constructed pry-out panel assemblies 48, 50 and 52 are positioned at the intersections of the side walls 26, 28 and 30, respectively, with the top wall 32. Each of the pryout panel assemblies includes a pair of aligned pry-out tabs 54 which is centrally apertured, as at 56, to receive the point of a screwdriver or similar implement, and is joined to the surrounding synthetic resin of the housing 22 by a pair of very thin webs 58 a pry-out panel assembly of this type is shown in U.S. Pat. No. 3,773,968, assigned to the assignee of the present application.

The hanger bracket assembly 24 is generally U-shaped in cross-sectional configuration, and includes a top panel 60 having a pair of downwardly depending leg panels 62 extending from opposite side edges thereof, and defining an elongated channel through the hanger bracket for receiving the extensible rod 12. The leg panels 62 each have horizontally offset portions 62a for accommodating ribs carried on the upper side of a closure plate as hereinafter described. Centrally positioned on the upper side of the top panel 60, and formed integrally therewith, is an internally threaded boss 64 which receives a set screw 66 used to engage the extensible rod 12 employed for mounting the ceiling box 10 in the manner shown in FIG. 1.

Figures 4, 5:
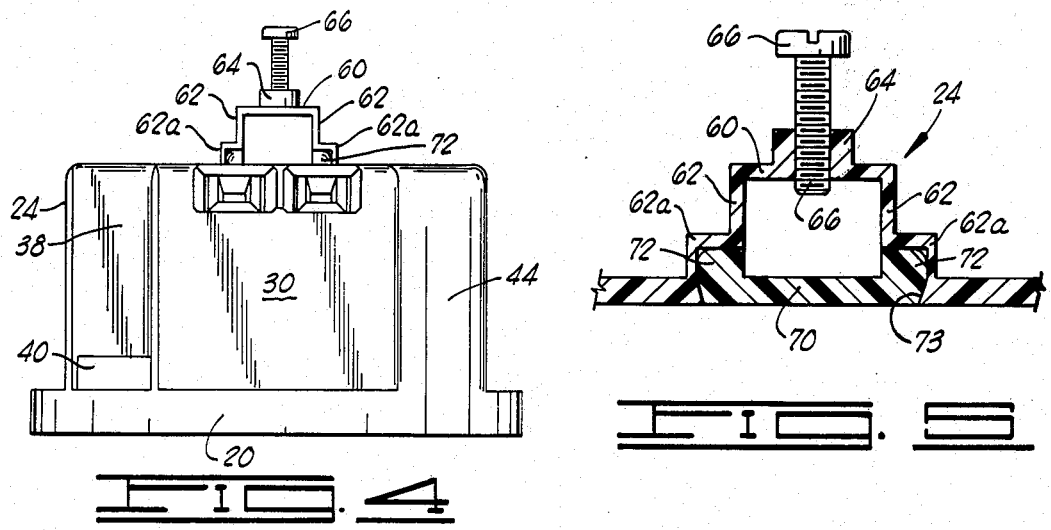
FIG. 4 is a side elevation view of the ceiling box.
FIG. 5 is a sectional view taken along line 5—5 of FIG. 2.

As the ceiling box 10 of the invention is manufactured using a straight draw molding process as hereinafter described, the box is initially formed with a relatively large aperture formed through the top wall 32 immediately beneath the hanger bracket 24. The outline of this aperture is perceptible in FIGS. 2 and 3 and is indicated by reference numeral 68. The provision of the aperture 68 at this location facilitates the formation of the hanger bracket 24 integrally with the housing 22 during the straight draw molding of the ceiling box. For purposes of complying with certain electrical code requirements, however, once the ceiling box has been formed, the aperture at the location described is closed by means of a closure plate or panel 70 which is fitted into the aperture 68. The closure plate 70 carries on its upper side, a pair of elongated, radiused ribs 72 which are positioned under the offset portions 62a of the leg panels 62 forming part of the hanger bracket 24. The peripheral edge of the closure plate 70 is beveled inwardly and downwardly as shown at 73 in FIG. 5 to facilitate snapping the plate into the matingly beveled opening 68. The radius formed at the upper edge of the beveled edge 73 allows the snap-in engagement.

In referring to FIG. 3 of the drawings, it will be noted that the screw receiving lugs 36 and 40 are accessible from the open bottom side of the ceiling box 10, and that suitable screws may be used for securing a female socket plate or other appropriate access plate to the bottom side of the ceiling box after it has been mounted in the ceiling in the manner shown in FIG. 1.

In the manufacture of the ceiling box of the present invention, the geometric configuration of the box which is characteristic thereof permits it to be quickly and easily formed by a straight draw molding process. In this process, a two-part mold is employed in which a male die or mold part reciprocates with respect to a female die or mold part. The surfaces of the box, including those encountered in the hanger bracket 24, are oriented such that all of them may be formed by this straight draw molding procedure, and it is not necessary to include any side coring mold parts in the molding procedure. Formation of the hanger bracket 24 in this fashion is facilitated by the aperture 68 formed through the top wall 32 of the housing 22. In this way, the hanger bracket is integrally formed with the remainder of the ceiling box, and is therefore characterized in having greater mechanical strength and an improved service life over those types of ceiling boxes in which the hanger bracket is riveted or screwed to the housing after the housing had been fabricated.

In conjunction with the formation of the hanger bracket in the manner described, the formation of the pry-out panel assemblies 46–52 on angles of 45° with respect to the top wall 32 and the several side walls of the housing 22 permits this portion of the box to also be formed by the straight draw molding process.

Although a preferred embodiment of the invention has been herein described in order to exemplify the basic principles underlying this invention, it is to be understood that various changes and innovations can be made in the structure described and depicted herein without departure from these basic principles. Thus, the straight draw molding process can be employed despite some variations in the external geometry of the housing 22, as well as changes in the shape of the shallow cylindrical base 20. Some changes in the dimension and specific geometry of the hanger bracket can also be effected while retaining the described advantages. These changes, as well as others which will be apparent to those skilled in the art, can be effected without sacrifice of the advantages derivative from the straight draw molding process which can be used in the construction of the present invention, and without relinquishment of the economies of manufacture, and the durability and mechanical strength which characterize the ceiling boxes of the invention. All changes and innovations of this type are therefore deemed to be circumscribed by the spirit and scope of this invention except as the same may be necessarily limited by the appended claims or reasonable equivalents thereof.

What is claimed is:

1. A ceiling box for electrical outlets comprising:

a synthetic resin unitary housing having side walls and a top wall extending normal to, and formed integrally with, said side walls, said top wall having an opening therethrough; and a synthetic resin hanger bracket of generally U-shaped cross-sectional configuration projecting upwardly from, and formed integrally with, said top wall, said hanger bracket including a top panel extending substantially parallel to said top wall over said opening, and a pair of leg panels interconnecting said top wall and top panel and positioned on opposite sides of said opening, said hanger bracket defining a passageway extending substantially parallel to said top wall; and a closure plate positioned in, and closing, the opening in said top wall.

2. A ceiling box for electrical outlets comprising:

a synthetic resin unitary housing having side walls and a top wall extending normal to, and formed integrally with, said side walls, said top wall having an opening therethrough, said housing further including at least one pry-out panel assembly extending between said top wall and one of said side walls and formed integrally therewith, each of said pry-out panel assemblies lying in a plane substantially at a 45° angle with respect to said top wall and said one side wall, and each of said pry-out panel assemblies including:

an apertured pry-out tab; and frangible web means interconnecting the tab with said top wall and said one side wall; and a synthetic resin hanger bracket of generally U-shaped cross-sectional configuration projecting upwardly from, and formed integrally with, said top wall, said hanger bracket including a top panel extending substantially parallel to said top wall over said opening, and a pair of leg panels interconnecting said top wall and top panel and positioned on opposite sides of said opening, said hanger bracket defining a passageway extending substantially parallel to said top wall.

3. A ceiling box for electrical outlets comprising:

a synthetic resin unitary housing of generally right parallelepiped configuration, said housing having side walls and a top wall extending normal to, and formed integrally with, said side walls, said top wall having an opening therethrough, and said housing further including elongated indentations at opposite corners of said housing, and each extending from said top wall downwardly between the adjacent pair of side walls and interconnecting said adjacent pair of side walls; and a synthetic resin hanger bracket of generally U-shaped cross-sectional configuration projecting upwardly from, and formed integrally with, said top wall, said hanger bracket including a top panel extending substantially parallel to said top wall over said opening, and a pair of leg panels interconnecting said top wall and top panel and positioned on opposite sides of said opening, said hanger bracket defining a passageway extending substantially parallel to said top wall.

4. A ceiling box for electrical outlets comprising:

a synthetic resin unitary housing of generally right parallelepiped configuration including four side walls and a top wall extending normal to, and formed integrally with, said side walls, said top wall having an opening therethrough;

a cylindrical base formed integrally with said housing at the lower end of said side walls and on the opposite side thereof from said top wall and adapted to receive a plate closing said ceiling box;

at least two screw receiving lugs inside said box adjacent said cylindrical base;

elongated indentations formed at opposite corners of said housing and each extending from said top wall downwardly between adjacent side walls; and a synthetic resin hanger bracket of generally U-shaped cross-sectional configuration projecting upwardly from, and formed integrally with, said top wall, said hanger bracket including a top panel extending substantially parallel to said top wall over said opening, and a pair of leg panels interconnecting said top wall and top panel, and positioned on opposite sides of said opening, said hanger bracket defining a passageway extending substantially parallel to said top panel.

5. In a synthetic resin ceiling box for electrical outlets, the improvement comprising a hanger bracket formed integrally with a wall of said ceiling box and including:

a top panel extending substantially parallel to said wall; and a pair of leg panels connecting said top panel to said wall and defining with said top panel, an elongated, open-ended channel through said hanger bracket, each of said leg panels having offset portions therein adjacent said wall for receiving and engaging a ribbed closure plate adapted to close an aperture in said wall directly under the top panel of said hanger bracket.

6. A ceiling box for electrical outlets comprising:

a synthetic resin unitary housing having at least one side wall and a top wall extending normal thereto, and formed integrally therewith, said top wall having an opening therethrough, said housing further including at least one pry-out panel assembly extending between said top wall and one of said side walls, and formed integrally therewith, each of said pry-out assemblies lying in a plane extending at an acute angle with respect to said top wall and said one side wall, and each including:

an apertured pry-out tab; and frangible web means interconnecting the tab with said top wall and said one side wall; and a synthetic resin hanger bracket of generally U-shaped cross-sectional configuration projecting upwardly from, and formed integrally with, said top wall and straddling the opening in said top wall, said hanger bracket defining a passageway extending substantially parallel to said top wall.

* * * * *